(12) United States Patent
Hsu et al.

(10) Patent No.: US 8,489,287 B2
(45) Date of Patent: Jul. 16, 2013

(54) VEHICLE ROLL OVER PREVENTION SAFETY DRIVING SYSTEM AND METHOD

(75) Inventors: Tsung-Hua Hsu, Changhua County (TW); Chun-Hsiung Chen, Changhua County (TW); Tzu-Chien Hsu, Changhua County (TW); Yi-Feng Su, Changhua County (TW); Hsueh-Lung Liao, Changhua County (TW)

(73) Assignee: Automotive Research & Test Center, Changhua County (TW)

( * ) Notice: Subject to any disclaimer, the term of this patent is extended or adjusted under 35 U.S.C. 154(b) by 39 days.

(21) Appl. No.: 12/982,953

(22) Filed: Dec. 31, 2010

(65) Prior Publication Data

US 2012/0173083 A1    Jul. 5, 2012

(51) Int. Cl.
*B60R 22/00* (2006.01)
*G06F 7/00* (2006.01)
*G06F 17/00* (2006.01)
*E05F 15/00* (2006.01)
*G05D 1/00* (2006.01)

(52) U.S. Cl.
USPC ............... 701/45; 701/65; 701/70; 701/72; 701/80; 180/271; 180/275; 180/279; 180/282; 180/283

(58) Field of Classification Search
USPC ............... 701/45, 65, 70, 72, 80; 180/271, 180/275, 279, 282, 283, 284, 285
See application file for complete search history.

(56) References Cited

U.S. PATENT DOCUMENTS

| 7,197,388 | B2 * | 3/2007 | Xu et al. ................... 701/70 |
| 2009/0201140 | A1 * | 8/2009 | Fargas et al. ............... 340/441 |
| 2010/0189306 | A1 * | 7/2010 | Kageyama et al. .......... 382/104 |

OTHER PUBLICATIONS

Zhang, Handong, et al., "Summary of Distance Measurement Based on Vision in Localization Technology", Aug. 14-16, 2006, Power Electronics and Motion Control Conference, 2006. IPEMC 2006. CES/IEEE 5th International.*
Aguilera, Vincent, et al., "An Advanced Driver Speed Assistance in Curves: risk function, cooperative modes, system architecture, and experimental validation.", Jun. 6-8, 2005, Intelligent Vehicles Symposium, 2005. Proceedings. IEEE, p. 807-812.*

\* cited by examiner

*Primary Examiner* — James Trammell
*Assistant Examiner* — Daniel L Greene
(74) *Attorney, Agent, or Firm* — Rosenberg, Klein & Lee (57) ABSTRACT

A vehicle rollover prevention safety driving system, comprising: at least an image sensor, used to fetch road images in front of said vehicle; an image processor, connected to said image sensor, and is used to identify a drive lane in road images, and calculate a drive lane curvature, an inclination angle of said road, and relative positions of said vehicle and a lane marking; a vehicle conditions sensing module, used to sense dynamic information of a vehicle turning angle, a vehicle inclination angle, and a vehicle speed; a microprocessor, connected to said image processor and said vehicle conditions sensing module, and it calculates a rollover prediction point and a rollover threshold speed, and it issues a corresponding warning signal or a control signal; and an accelerator and brake controller, connected to said microprocessor, and it controls deceleration of said vehicle according to said control signal.

8 Claims, 7 Drawing Sheets

VEHICLE ROLL OVER PREVENTION SAFETY DRIVING SYSTEM AND METHOD

BACKGROUND OF THE INVENTION

1. Field of the Invention

The present invention relates to a vehicle rollover prevention safety driving system and method, and in particular to a vehicle rollover prevention safety driving system and method, that is capable of calculating curvature of drive lane and inclination angle of road, thus obtaining rollover prediction point and rollover threshold speed, for issuing warning to the driver to get better control or slow down in time, so as to achieving driving safety.

2. The Prior Arts

Nowadays, due to the widespread utilization of vehicles, the differences between various places can be effectively reduced, thus making societies in various places of the world to be unified as a whole. However, the popularization of motor vehicle has its drawback and disadvantages in that, in recent years, traffic accidents and casualties have been increasing steadily. The main reasons for this is that, drivers do not pay enough attention to the road conditions, due to negligence or lose concentration while driving, thus leading to traffic accidents.

In order to increase driving safety and reduce traffic accidents, presently, Global Positioning System (GPS) of satellite is utilized to detect the road and traffic conditions in front of the vehicle through the cooperation of drawings and information; or image recognition is utilized to identify drive lanes and calculate curvature of road, hereby continuously monitoring and analyzing road and vehicle driving conditions. As such, when the vehicle deviates from the drive lanes or driving too fast while turning around a corner, the driver can be warned to make correction of driving direction or slow down, so as to avoid accidents from happening. However, the deviations of GPS system is rather large, usually around 3 to 30 meters, and its accuracy is rather insufficient. In addition, in case that image recognition is used to identify the inclination of road, it is liable to lead to miscalculation of curvature of drive lane. Therefore, presently, the vehicle driving safe system is not quite satisfactory, and it has much room for improvement.

Therefore, presently, the vehicle driving safe system of the prior art is not quite satisfactory, and it has much room for improvement.

SUMMARY OF THE INVENTION

In view of the problems and shortcomings of the prior art, the present invention provides a vehicle rollover prevention safety driving system and method, so as to overcome the problem and shortcomings of the prior art.

A major objective of the present invention is to provide a vehicle rollover prevention safety driving system and method, which utilizes perspective vision processing to calculate the precise road inclination angle and drive lane curvature variations, hereby issuing warning to the driver to slow down or take precautionary measures; or the system automatically correct the vehicle speed, in keeping it below the threshold rollover speed, thus avoiding slipping or turning over of the vehicle.

Another objective of the present invention is to provide a vehicle rollover prevention safety driving system and method, which can be applied to the image recognition of a planar road or an inclined road, such that perspective vision processing is used to an error correction value for the inclination angle of an image sensor, so as to correct the error between the measure inclination angle and actual inclination angle of the image sensor.

To achieve the above-mentioned objective, the present invention provides a vehicle rollover prevention safety driving method, comprising the following steps: fetching at least a road image in front of the vehicle; determining if drive lanes are in the road image, in case the answer if negative, then re-fetching a road image, otherwise, calculating and obtaining the curvature of the drive lane, inclination angle of the road, the relative positions of the vehicle and drive lane; calculating a rollover prediction point and a rollover threshold speed based on the vehicle dynamic information, curvature of the drive lane, inclination angle of the road; and determining if the vehicle speed is over the rollover threshold speed, in case the answer if negative, recalculate the curvature of the drive lane, inclination angle of the road, the relative positions of the vehicle and drive lane; otherwise, issuing a warning to the driver to slow down or take other precautionary measures, or the system itself automatically slows down the vehicle or takes necessary measures relative to the rollover prediction point and a rollover threshold speed.

The present invention further provides a vehicle rollover prevention safety driving system, comprising: at least an image sensor, used to fetch road images in front of a vehicle; an image processor, connected to the image sensor, and is used to identify the drive lane in the road images, and calculate the drive lane, inclination angle of the road, and the relative positions of the vehicle and drive lane, as based on the drive lane; a vehicle conditions sensing module, used to sense the dynamic information of vehicle turning angle, vehicle inclination angle, and vehicle speed; a microprocessor, connected to the image processor and vehicle conditions sensing module, and it calculates a rollover prediction point and a rollover threshold speed based on the vehicle dynamic information, curvature of the drive lane, inclination angle of the road, and it issues a corresponding warning signal or a control signal; and an accelerator and brake controller, connected to the microprocessor, and it control the acceleration and deceleration according to the control signal.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
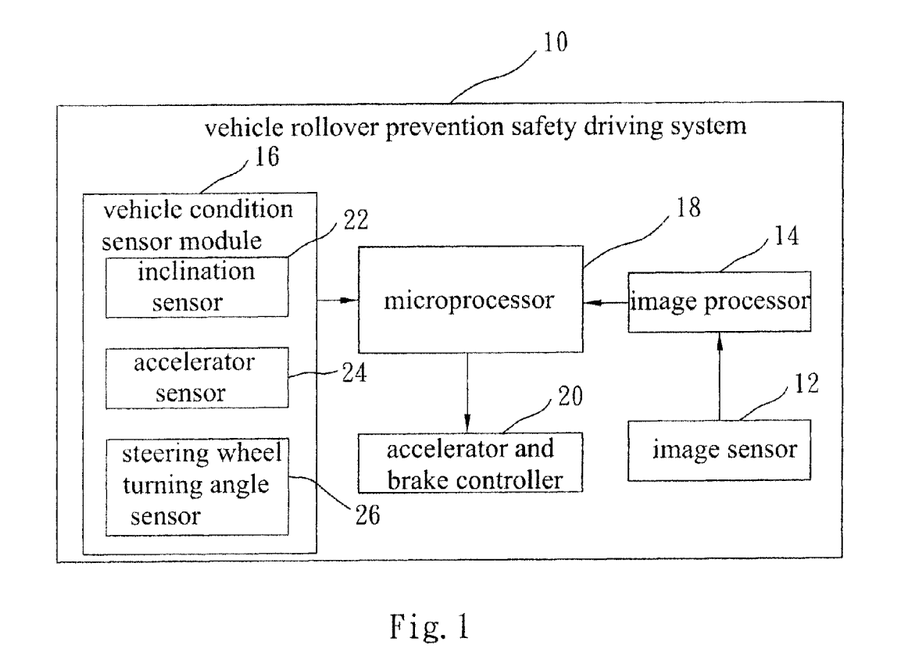
FIG. 1 is a block diagram of the vehicle rollover prevention safety driving system according to the present invention.
Figure 2:
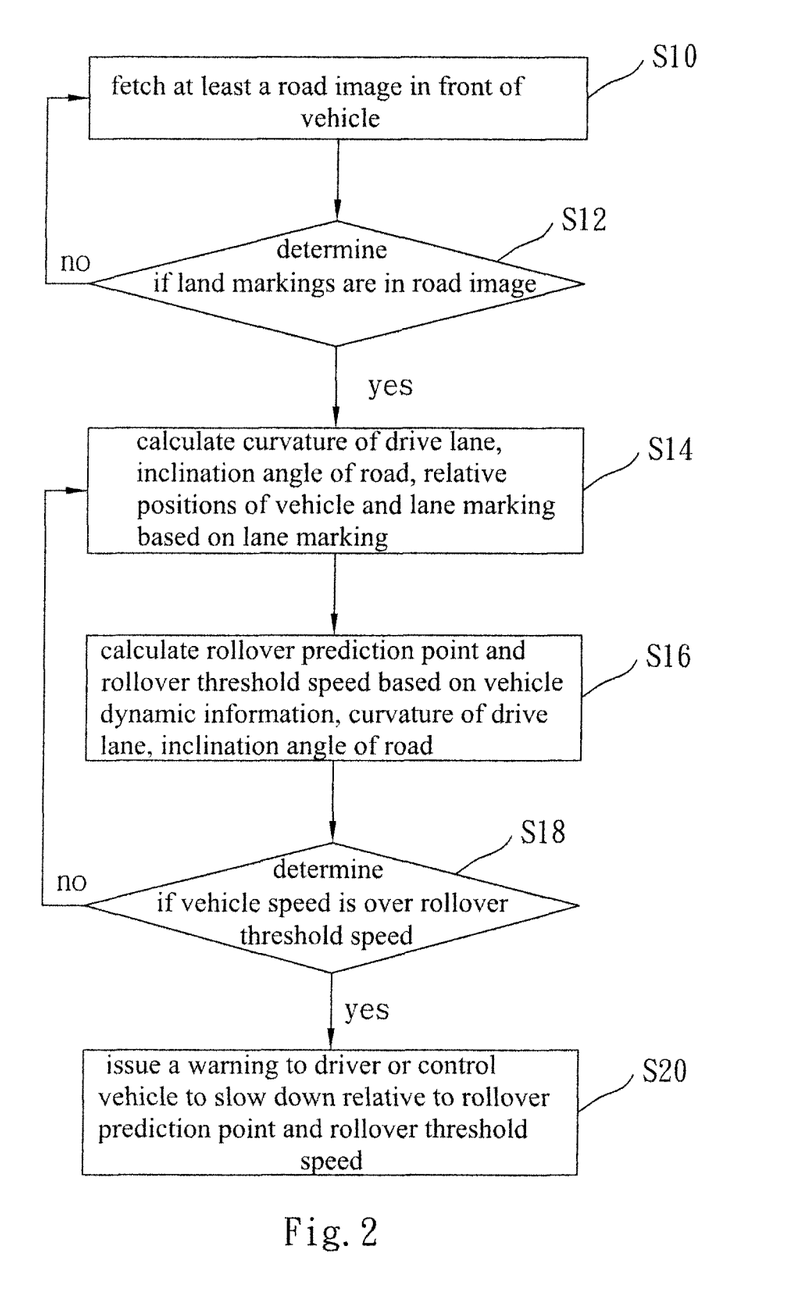
FIG. 2 is a flowchart of the steps of the vehicle rollover prevention safety driving method according to the present invention.

Refer to FIG. 1 is a block diagram of the vehicle rollover prevention safety driving system according to the present invention, also refer to FIG. 2 is a flowchart of the steps of the vehicle rollover prevention safety driving method according to the present invention. As shown in FIG. 1, the vehicle rollover prevention safety driving system 10 is disposed in a vehicle, comprising an image sensor 12, an image processor 14, a vehicle condition sensor module 16, a microprocessor 18, and a accelerator and brake controller 20; the microprocessor 18 is connected to the image processor 14, the vehicle condition sensor module 16, and the accelerator and brake controller 20. In the structure mentioned above, the vehicle condition sensor module 16 further includes an inclination sensor 22, an accelerator sensor 24, and a steering wheel turning angle sensor 26. The inclination sensor 22 is used to sense the inclination angle of a vehicle, the accelerator sensor 24 is used to sense the speed of a vehicle, and the steering wheel turning angle sensor 26 is used to sense the turning angle of a vehicle. The image sensor 12 is connected to the image processor 14, and the image sensor 12 can be a Charge Coupled Device (CCD) or a CMOS camera, preferably disposed on the rear mirror or windshield. Then, refer to FIG. 2, as shown in FIG. 2, in step S10, utilizing the image sensor 12 to fetch the road image in front of the vehicle, then as shown in step S12, utilizing the image processor 14 to determine if there is traffic lines in the image, if the answer is negative, then execute step S10, fetching again the road images in front of the vehicle; otherwise, execute step S14, the image processor 14 calculate the drive lane curvature, the inclination angle of road, the relative positions of vehicle and drive lane, wherein, the image processor 14 utilizes a lane marking model in calculating the slope of the drive lane, curvature of drive lane, the relative positions of vehicle and lane marking, the equation of lane marking model is as follows:

$$X_w = k \cdot Y_W^2 + m \cdot Y_W + b$$

wherein, $X_W Y_W Z_W$ indicate world coordinate axis, k, m, and b indicates parameters of lane marking model. Through the first order differentiation utilizing the lane marking model, the slope of drive lane can be obtained, and the equation of lane marking model is: $\epsilon_1 = 2 \cdot k \cdot Y_W + m$, $\epsilon_l$ indicates the slope of drive lane of the vehicle. Then perform second order differentiation utilizing the equation of drive lane slope to obtain the curvature of drive lane by means of its equation of $C_1 = 2 \cdot k$. Through the drive lane slope, the lateral displacement of the vehicle can be obtained through the equation $\Delta Y = Y_L - L \times \epsilon_L$, wherein $\Delta Y$ indicate $Y_L$ lateral displacement of the vehicle, and L indicates the pre-view distance slope. After obtaining the drive lane slope, the distance from vehicle to the lane marking can be calculated. In other words, the relative positions of the vehicle and lane marking can be calculated through the following equations:

$$\Delta Y = \begin{cases} \frac{b_R}{2} + \left(\frac{b_V}{2} - Y_L - L \times \varepsilon_L\right) \\ \frac{b_R}{2} - \left(\frac{b_V}{2} - Y_L - L \times \varepsilon_L\right) \end{cases}$$

Figure 3:
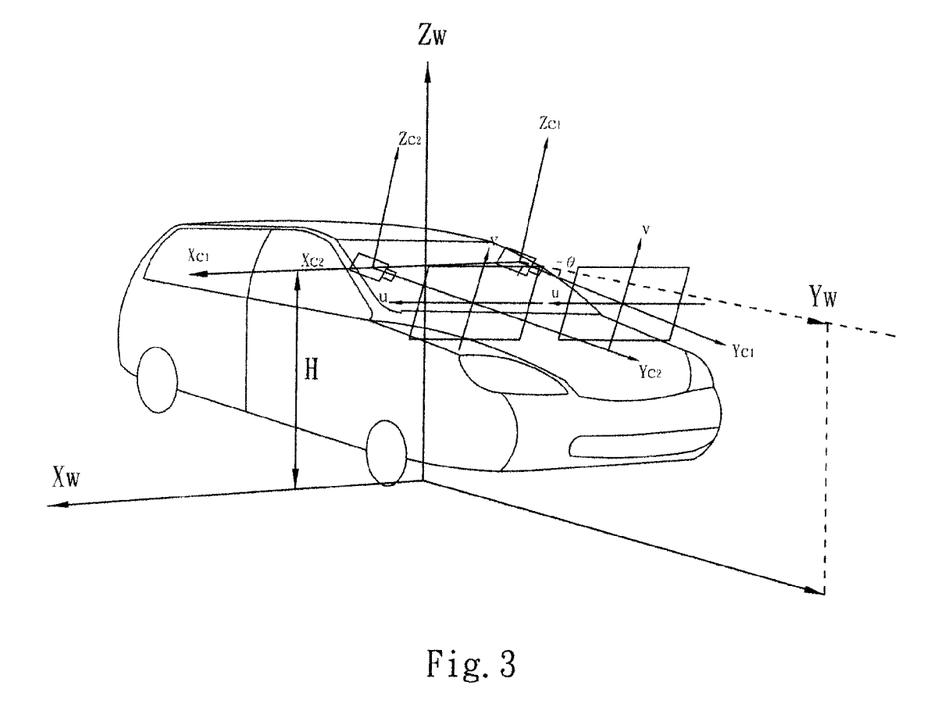
FIG. 3 is a schematic diagram of the drive lane model transformed a universal coordinate to an image coordinate.

Wherein, $b_R$ indicates width of the drive lane, $b_V$ indicates width of the vehicle. Please refer to FIG. 3 at the same time, wherein is shown a lane marking model in an image coordinate as transformed from a world coordinate, and the image coordinate is based on the world coordinate, such that an image processor 14 is used to project the lane marking model onto a lane marking model based on the image model, then perform transformation from the world coordinate to the image coordinate, wherein the equation of lane marking model of the image coordinate is as follows:

$$u = \frac{k e_u e_v H}{e_u m_\theta - v} + m e_u + \frac{b e_u}{H e_v}(e_v m_\theta - v)$$

$$m_\theta = \tan\theta + \tan\alpha$$

wherein, u is the horizontal coordinate of the image plane, and v is the vertical coordinate of the image plane, $e_u$ is the focal length of u, and $e_v$ is the focal length of v, and $e_u/e_v$ is, the unit is pixel, H indicates the height of image sensor disposed on the vehicle, k,m,b indicate the parameter of lane marking model, $m_{74}$ indicates the inclination angle of an image sensor 12. The inclination angle of the image sensor 12 is defined as the angle between the center line of image sensor 12 and the actual road, in case that the actual road has an inclination angle or an upward slope, then it cause error in the drive lane curvature as calculated by image processor 14.

Figure 4:
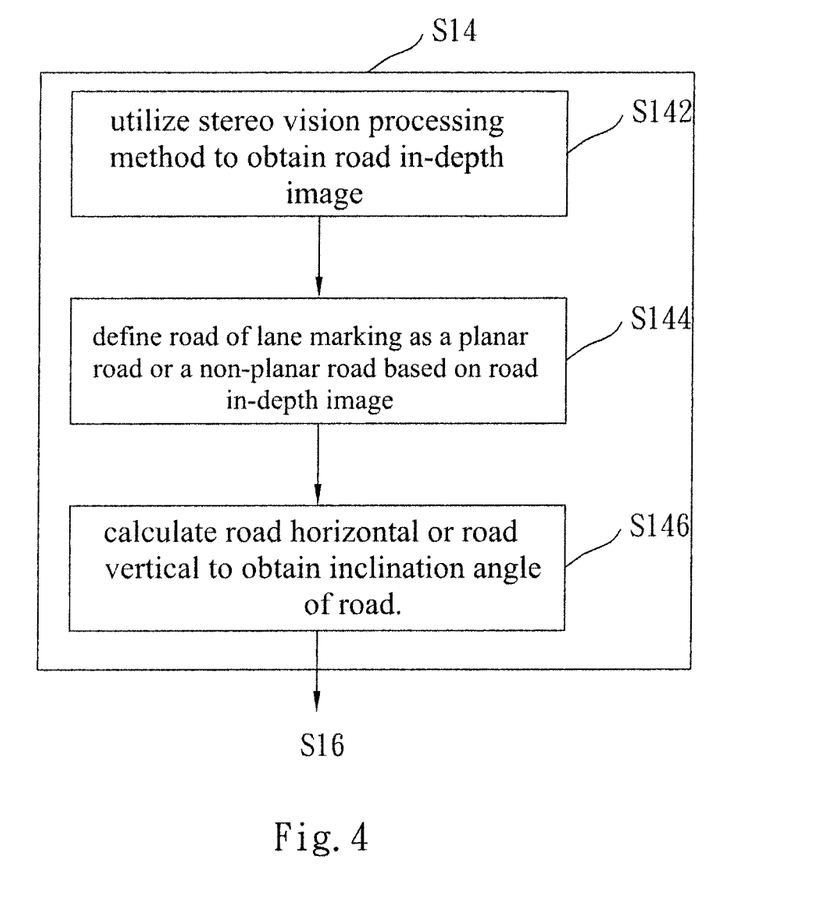
FIG. 4 is a flowchart of the steps of calculating inclination angle of road according to the present invention.
Figure 5:
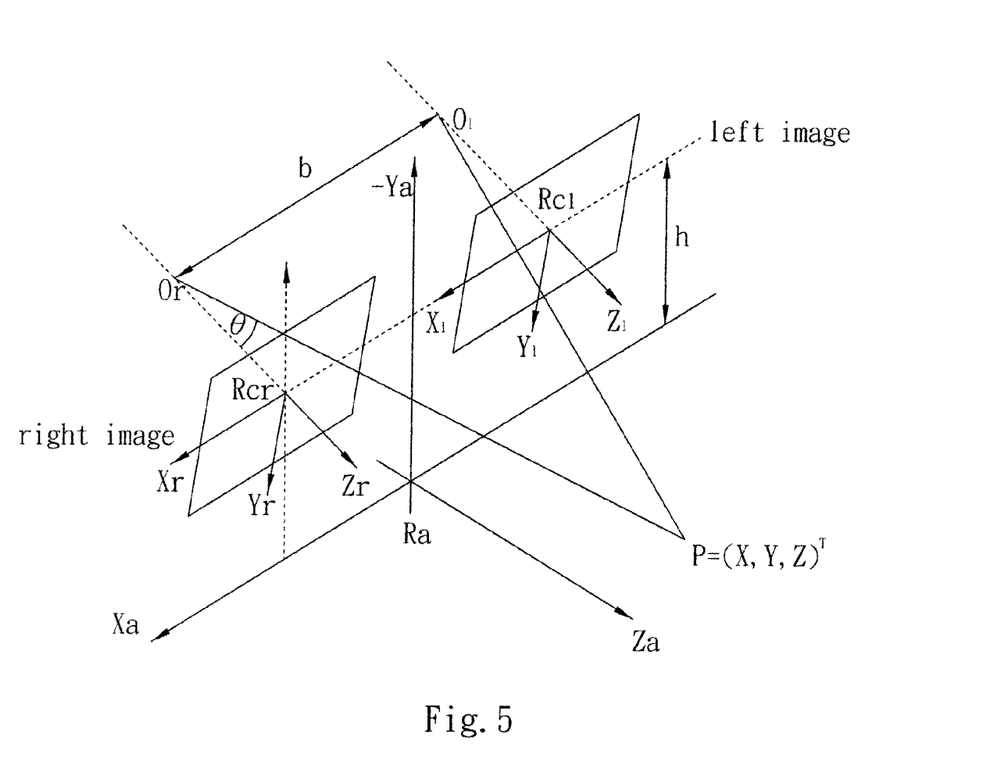
FIG. 5 is a schematic diagram of the ways of obtaining in-depth image of road by means of perspective image processing according to the present invention.
Figure 6:
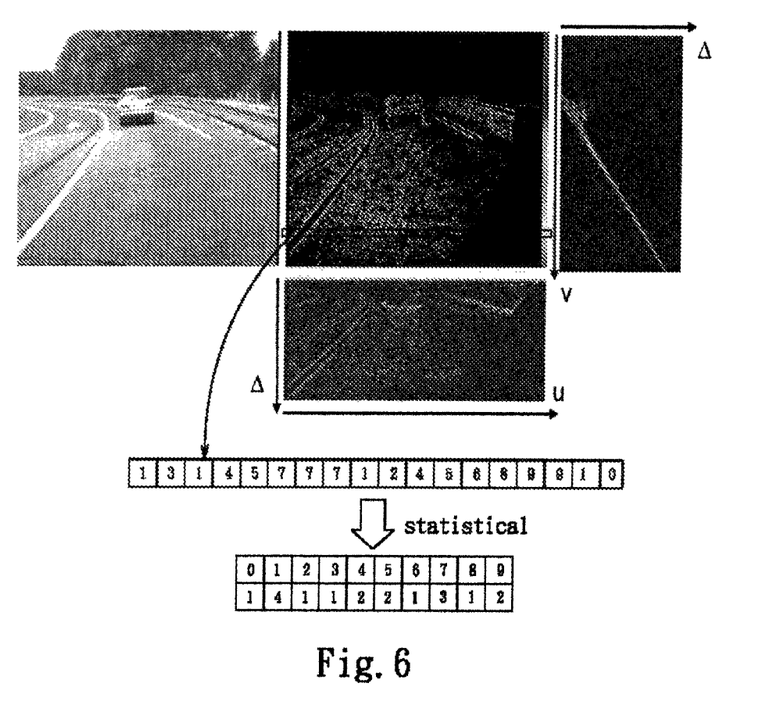
FIG. 6 is schematic diagram of the ways of obtaining in-depth image of road by means of another perspective image processing.

The purpose of the present invention is to eliminate the error of the drive lane curvature, refer simultaneously to FIGS. 4 and 5 at the same time. FIG. 4 is a flowchart of the steps of calculating inclination angle of road according to the present invention, and FIG. 5 is a schematic diagram of the ways of obtaining in-depth image of road by means of perspective image processing according to the present invention. As shown in FIG. 4, in step S14, the step of calculating inclination angle of road using an image processor 14 includes the following steps: as shown in step S142, the image processor 14 utilizes a perspective vision processing method to obtain an in-depth image or a road, such that through two corresponding images as taken by two image sensors, restore the actual distance between the actual road image and the fetched road image as in the images taken by the two image sensors 12, the equation for calculating the actual distance is:

$$\frac{\Delta x1}{f} = \frac{X}{Z}; \quad \frac{\Delta x2}{f} = \frac{X-b}{Z}; \quad \& \quad Z \frac{bf}{(\Delta x1 - \Delta x2)};$$

wherein, X and Z indicate the X axis and Y axis of the actual road image, the center points of imaging planes of the two image sensors are in parallel, b indicates the distance between the right image plane and the left image plane, the first cross point is the intersection point of the line section from actual road image to the right image plane center point, and the line section from the left image plane X axis to right image plane X axis, $\Delta x1$ is the distance from the first cross point to the right inner image plane center point, the second cross point is the intersection point of the line section from actual road image to the left image plane center point, and the line section from the right image plane X axis to left image plane X axis, Δx2 is the distance from the second cross point to the left inner image plane center point, and f is the focal length of the image sensor. Then, as shown in step S144, the image processor 14 defines the road of lane marking is planar road or a non-planar road based on the in-depth image of the road. Finally, perform step S146, calculate road horizontal and road vertical in obtaining the inclination angle of the road. Refer to FIG. 6, the position differences of the road corresponding points in a pair of images is referred to as disparity, thus the in-depth image of the road can be obtained through utilizing a perspective vision processor. The in-depth view information map of each pixel point of the original image can be obtained through a perspective comparison method, which is referred to as disparity map, then projecting the disparity in-depth road images onto the Y (Δ) axis of road of the lane marking, Y axis is the image vertical axis coordinate, and X value (V) is disparity value. The image sensor 12 nearest to the characteristic point will have larger disparity value. In the image, points in a same plane will present a straight line in a V-disparity map, then a U-disparity map is used to help determine if there is any angle variations in the road horizontal. In this way, the inclination angle of the road can be obtained. As such, the variations of inclination angles of road in front of the vehicle can be obtained.

Therefore, the image processor 14 can utilize the perspective vision processing method in calculating the error correction values of drive lane inclination angle by means of the following equation:

$$\alpha = f(h, f_x, f_y, c_b, c_x, u)$$

$$\theta = f(h, d, f_x, f_y, c_b, c_y, v)$$

Then, substitute α and θ into $m_\theta = \tan \theta + \tan \alpha$ of the lane marking model equation of the image coordinate, so as to correct the error of the drive lane inclination angle.

Subsequently, in step S16, the microprocessor 18 calculate a vehicle rollover forecast point and a rollover threshold speed based on the vehicle dynamic information, such as its turning angle, inclination angle, speed, drive lane curvature, and road inclination angle as obtained by the sensor module 16. In the description mentioned above, the rollover threshold speed is calculated through using the following equation:

$$V_{max} = \sqrt{(a_{max} + ge)R}$$

Wherein, Vmax indicates the maximum threshold speed, g indicates the gravitational acceleration, namely g=9.80665m/s^2, e is the road inclination angle, R indicates curvature radius of drive lane curvature, amax indicate the side acceleration of a vehicle. Wherein, the maximum vehicle rollover speed is mainly restricted to the position of gravitation center of vehicle side acceleration, such that the most direct way of avoiding vehicle rollover is to reduce the vehicle turn corner speed. In this respect, the equation of side acceleration of a vehicle is $$a_{max} = \frac{(RT - SM)g}{1.15}$$

wherein, Rollover Threshold (RT) is the threshold value for rollover of a vehicle, and SM is a preset safety turn corner coefficient. Since the conditions for each vehicle is different, such that the roll over threshold value can be varied depending on its load as shown in the following table

| range of load (kg) | roll over threshold value |
|---|---|
| 0-15.875 | 0.73 g |
| less than 15.876-22.680 | 0.60 g |
| less than 22.681-29.484 | 0.50 g |
| less than 29.485-36.287 | 0.38 g |
| less than 36.288-45.359 | 0.36 g |

Figure 7:
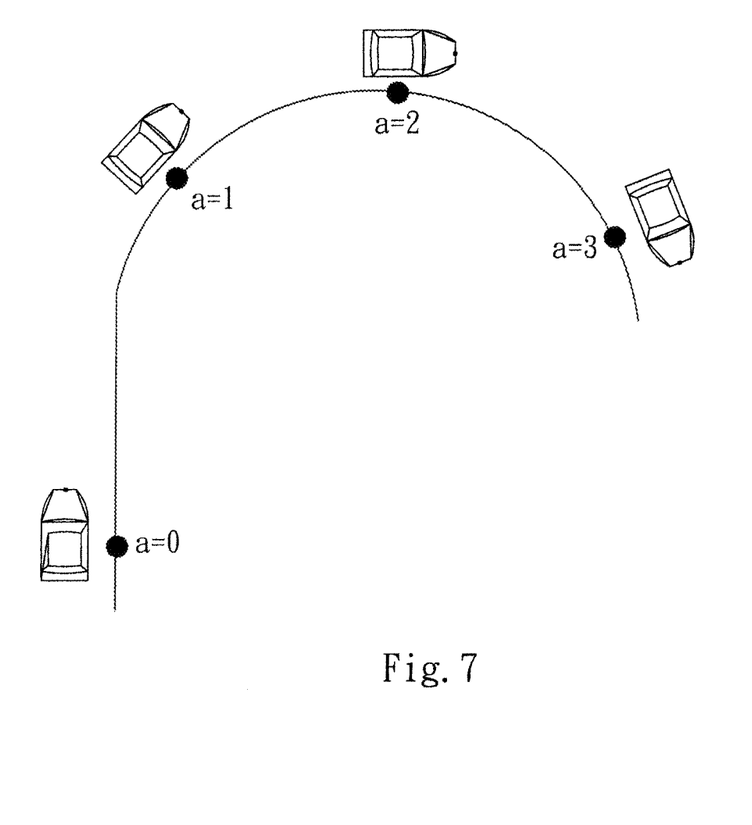
FIG. 7 is a schematic diagram of a vehicle turning around a corner.

Then as shown in step S18, the microprocessor 18 determines that if the vehicle speed is over the roll over threshold speed, in case the answer is negative, return to step S14; otherwise, execute step S20. At this time, the vehicle enters into a curved route, as shown in FIG. 7, at the initial stage of the vehicle entering into a curve route, the microprocessor 18 will issue a warning signal, such as a voice or vibration in warning the driver that presently the vehicle speed is too fast, the vehicle can not move safely on the curved route, and he should slow the vehicle down, thus achieving the pre-warning effect; or, in case at this time, the microprocessor 18 has already issued a warning signal, and the driver still does not have the intention to slow down, then the microprocessor 18 will issue a control signal based on the parameters of turning angle sensed by the steering wheel angle sensor 26, and distance to rollover prediction point. Wherein, the rollover prediction point can be obtained through the utilizing the road inclination angle, the inclination angle of the vehicle and the road curvature as sensed by the inclination sensor 22 (for example, gyroscope), to calculate the optimal prediction point. Furthermore, the accelerator and brake controller 20 will then control the vehicle to slow down based on the control signal. In other words, the microprocessor 18 will regulate the accelerator and the brake based on the rollover prediction point and rollover threshold speed, to automatically reduce the vehicle speed below the rollover threshold speed, herby preventing the rollover accident and ensuring safety driving of the vehicle.

Summing up the above, the present invention utilizes perspective vision processing method to calculate precise drive lane inclination angle and variations of drive lane curvature, and output warning to alarm the driver to take precautionary measure to slow down, or automatically regulate the vehicle speed below the rollover threshold speed, thus preventing the skid or rollover of the vehicle. In addition, the present invention uses the perspective vision processing method to calculate the error correction value of the inclination angle of the image sensor, thus achieving correcting the error of the inclination angle of the image sensor and the actual angle of the prior art.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:
1. A vehicle rollover prevention safety driving method, comprising the following steps:
(A) fetching at least a road image in front of said vehicle;
(B) determining if drive lanes are in a road image, in case the answer is negative, return to step (A), otherwise perform step (C);

(C) calculating by a processor a curvature of said drive lane, inclination angle of the road, and the relative positions of said vehicle on said drive lane based on a lane marking;
(D) calculating a rollover prediction point and a rollover threshold speed based on vehicle dynamic information, said curvature of the drive lane, said inclination angle of the road; and
(E) determining if said vehicle speed is over a rollover threshold speed; in case the answer if negative, returning to said step (C); otherwise, issuing a warning to driver to slow down said vehicle relative to said rollover prediction point and said rollover threshold speed, wherein in said step (C), a lane marking model is utilized to calculate a slope of said drive lane, said curvature of said drive lane, and said relative positions of said vehicle on said drive lane, wherein the equation of the lane marking model is:

$$X_w = k \cdot Y_w^2 + m \cdot Y_w + b,$$

wherein $X_w$ and $Y_w$ indicate world coordinate axes, respectively, and k, m, and b are parameters of said lane marking model,
wherein the slope $E_l$ of said drive lane is obtained by applying a first order differentiation to said lane marking model, where $E_l = 2 \cdot k Y_w + m$,
wherein said curvature $C_l$ of the drive lane is obtained by applying a second order differentiation to said lane marking model, where $C_l = 2 \cdot k$, and
wherein said relative positions $\Delta Y$ of said vehicle on said drive lane are obtained as:

$$\Delta Y = \begin{cases} \frac{b_R}{2} + \left(\frac{b_V}{2} - Y_L - L \times \varepsilon_l\right) \\ \frac{b_R}{2} - \left(\frac{b_V}{2} - Y_L - L \times \varepsilon_l\right) \end{cases}$$

where $b_R$ indicates width of the drive lane, $b_v$ indicates width of the vehicle, $Y_L$ is a lateral displacement of the vehicle from said drive lane, and L is a pre-view distance slope.

2. The vehicle rollover prevention safety driving method, as claimed in claim 1, wherein said lane marking model is based on a world coordinate, and an image processor is used to project said lane marking model onto said lane marking model based on an image coordinate, further comprising the steps of:
performing corresponding coordinate transformation, and applying a perspective vision processing method to calculate an error correction value of inclination angle of said drive lane.

3. The vehicle rollover prevention safety driving method, as claimed in claim 1,
wherein said rollover threshold speed is obtained through the following equation:

$$V_{max} = \sqrt{(a_{max} + ge)R}$$

wherein, Vmax indicates a maximum threshold speed, g indicates a gravitational acceleration, namely g=9.80665m/s^2, e is a road inclination angle, R indicates curvature radius of drive lane curvature, $a_{max}$ indicates a side acceleration of said vehicle.

4. The vehicle rollover prevention safety driving method, as claimed in claim 1, further comprising the steps of:
in said step (C) of calculating said inclination angle of road based on said lane marking by:
(C1) utilizing a perspective vision processing method to obtain a road in-depth image;
(C2) defining said road of said lane marking is a planar road or a non-planar road based on said road in-depth image; and
(C3) calculating said road horizontal or road vertical in obtaining said inclination angle of said road.

5. The vehicle rollover prevention safety driving method, as claimed in claim 4, wherein said perspective vision processing method is used to obtain an in-depth image of said road, such that through two corresponding images as taken by two image sensors, restore an actual distance between an actual road image and a fetched road image, an equation for calculating said actual distance is:

$$\frac{\Delta x1}{f} = \frac{X}{Z}; \frac{\Delta x2}{f} = \frac{X-b}{Z}; \text{AND } Z = \frac{bf}{(\Delta x1 - \Delta x2)};$$

wherein, X and Z indicate the X axis and Y axis of said actual road image, center points of imaging planes of two image sensors are in parallel, b indicates a distance between a right image plane and a left image plane, a first cross point is an intersection point of a line section from said actual road image to a right image plane center point, and said line section from the left image plane X axis to right image plane X axis, $\Delta x1$ is distance from said first cross point to a right inner image plane center point, a second cross point is said intersection point of said line section from said actual road image to a left image plane center point, and said line section from a right image plane X axis to a left image plane X axis, $\Delta x2$ is the distance from said second cross point to a left inner image plane center point, and f is a focal length of an image sensor.

6. A vehicle rollover prevention safety driving system, comprising:
at least an image sensor, said image sensor being adapted to fetch road images in front of said vehicle;
an image processor connected to said image sensor, said image processor being adapted to identify a drive lane in road images, and calculate a drive lane curvature, an inclination angle of said road, and relative positions n of said vehicle and a lane marking based on said lane marking model;
a vehicle conditions sensing module sensing dynamic information of a vehicle turning angle, a vehicle inclination angle, and a vehicle speed;
a microprocessor, connected to said image processor and said vehicle conditions sensing module, and calculating a rollover prediction point and a rollover threshold speed based on a curvature of the road, said inclination angle of said road, and said dynamic information, wherein said microprocessor issues a corresponding warning signal or a control signal; and
an accelerator and brake controller connected to said microprocessor, said accelerator and brake controller controlling deceleration of said vehicle according to said control signal,
wherein said image processor utilizes a lane marking model to calculate a slope of said drive lane, said drive lane curvature, and relative positions of said vehicle on said drive lane, wherein the equation of the lane marking model is:

$$X_w = k \cdot Y_w^2 + m \cdot Y_w + b,$$

wherein $X_w$ and $Y_w$ indicate world coordinate axes, respectively, and k, m, and b are parameters of said lane marking model, wherein the slope $E_l$ of said drive lane is obtained by applying a first order differentiation to said lane marking model, where $E_l = 2 \cdot k Y_w + m$, wherein said curvature $C_l$ of the drive lane is obtained by applying a second order differentiation to said lane marking model, where $C_l = 2 \cdot k$, and wherein said relative positions $\Delta Y$ of said vehicle on said drive lane are obtained as:

$$\Delta Y = \begin{cases} \frac{b_R}{2} + \left(\frac{b_V}{2} - Y_L - L \times \varepsilon_l\right) \\ \frac{b_R}{2} - \left(\frac{b_V}{2} - Y_L - L \times \varepsilon_l\right) \end{cases}$$

where $b_R$ indicates width of the drive lane, $b_V$ indicates width of the vehicle, $Y_L$ is a lateral displacement of the vehicle from said drive lane, and L is a pre-view distance slope.

7. The vehicle rollover prevention safety driving system, as claimed in claim 6,
wherein said vehicle conditions sensing module further comprises:
an inclination sensor adapted to sense an inclination angle of a vehicle;
an accelerator sensor adapted to detect speed of said vehicle; and
a steering wheel turning angle sensor adapted to sense a turning angle of said vehicle.

8. The vehicle rollover prevention safety driving system, as claimed in claim 6,
wherein said lane marking model is based on a world coordinate, and said image processor is adapted to project said lane marking model onto said lane marking model based on an image coordinate through performing corresponding coordinate transformation, and utilizing a perspective vision processing method to calculate an error correction value of said inclination angle of said drive lane.

\* \* \* \* \*